(12) United States Patent
Malloy, III

(10) Patent No.: US 10,529,457 B2
(45) Date of Patent: Jan. 7, 2020

(54) DEFENSE IN DEPTH SAFETY PARADIGM FOR NUCLEAR REACTOR

(71) Applicant: BWXT mPower, Inc., Charlotte, NC (US)

(72) Inventor: John D Malloy, III, Goode, VA (US)

(73) Assignee: BWXT mPower, Inc., Charlotte, NC (US)

( * ) Notice: Subject to any disclaimer, the term of this patent is extended or adjusted under 35 U.S.C. 154(b) by 590 days.

(21) Appl. No.: 13/864,053

(22) Filed: Apr. 16, 2013

(65) Prior Publication Data

US 2013/0301782 A1 Nov. 14, 2013

Related U.S. Application Data

(60) Provisional application No. 61/625,238, filed on Apr. 17, 2012, provisional application No. 61/625,244, filed on Apr. 17, 2012.

(51) Int. Cl.
*G21C 15/18* (2006.01)
*G21C 9/004* (2006.01)

(52) U.S. Cl.
CPC ............. *G21C 15/18* (2013.01); *G21C 9/004* (2013.01)

(58) Field of Classification Search
CPC .................................. G21C 15/18; G21C 7/32
(Continued)

(56) References Cited

U.S. PATENT DOCUMENTS 3,342,689 A * 9/1967 gaudez .................... G21C 1/20
376/307
3,702,281 A * 11/1972 Birts et al. ............. G21C 15/18
376/282
(Continued)

FOREIGN PATENT DOCUMENTS

DE          2942937 C2 * 10/1984 ............. G21C 15/18
JP       H04216494 A     8/1992

OTHER PUBLICATIONS

Castleberry, G. Babcock & Wilcox Pressurized Water Reactors. published online Mar. 19, 2012. available: <http://pdhonline.org/courses/e183/e183content.pdf>.*
(Continued)

*Primary Examiner* — Lily C Garner
(74) *Attorney, Agent, or Firm* — Nelson Mullins Riley & Scarborough LLP

(57) ABSTRACT

A nuclear reactor includes a nuclear reactor core disposed in a pressure vessel and immersed in primary coolant water at an operating pressure higher than atmospheric pressure. A containment structure contains the nuclear reactor. A reactor coolant inventory and purification system (RCI) is connected with the pressure vessel by make-up and letdown lines. The RCI includes a high pressure heat exchanger configured to operate responsive to a safety event at the operating pressure to remove heat from the primary coolant water in the pressure vessel. An auxiliary condenser located outside containment also removes heat. The RCI also includes a pump configured to inject make up water into the pressure vessel via the make-up line against the operating pressure. An emergency core cooling system (ECC) operates to depressurize the nuclear reactor only if the RCI and auxiliary condenser are unable to manage the safety event.

13 Claims, 3 Drawing Sheets

(58) Field of Classification Search
USPC .................................................. 376/282, 299
See application file for complete search history.

(56) References Cited

U.S. PATENT DOCUMENTS

| | | | |
|---|---|---|---|
| 3,956,063 A * | 5/1976 | Johnson ................. | G21C 15/18 376/282 |
| 4,818,475 A | 4/1989 | Gluntz et al. | |
| 4,897,240 A | 1/1990 | Sako | |
| 4,948,554 A | 8/1990 | Gou et al. | |
| 5,000,907 A | 3/1991 | Chevereau et al. | |
| 5,011,652 A * | 4/1991 | Tominaga ............... | G21C 15/18 376/282 |
| 5,045,274 A | 9/1991 | Donaldson | |
| 5,049,353 A | 9/1991 | Conway et al. | |
| 5,073,335 A * | 12/1991 | Townsend ................ | F04D 7/08 376/373 |
| 5,075,070 A | 12/1991 | Costes | |
| 5,087,408 A | 2/1992 | Tominaga et al. | |
| 5,102,616 A | 4/1992 | Gardner et al. | |
| 5,169,595 A | 12/1992 | Cooke | |
| 5,301,216 A | 4/1994 | Klapdor et al. | |
| 5,345,481 A | 9/1994 | Oosterkamp | |
| 5,377,242 A | 12/1994 | Carlton et al. | |
| 5,377,243 A | 12/1994 | Hill | |
| 5,517,538 A | 5/1996 | Seidelberger et al. | |
| 5,740,217 A | 4/1998 | Spinks | |
| 5,887,043 A | 3/1999 | Spinks | |
| 6,130,927 A | 10/2000 | Kang et al. | |
| 6,249,561 B1 | 6/2001 | Aburomia | |
| 6,259,760 B1 * | 7/2001 | Carelli ................... | G21C 1/086 376/346 |
| 6,275,557 B2 | 8/2001 | Nylund et al. | |
| 6,618,461 B2 | 9/2003 | Cheung et al. | |
| 6,636,578 B1 | 10/2003 | Clark | |
| 6,636,580 B2 | 10/2003 | Murakami et al. | |
| 6,795,518 B1 | 9/2004 | Conway et al. | |
| 6,819,733 B2 | 11/2004 | Broders et al. | |
| 6,865,242 B2 | 3/2005 | Barbe et al. | |
| 7,085,340 B2 | 8/2006 | Goldenfield et al. | |
| 7,257,185 B1 | 8/2007 | Yamada et al. | |
| 7,453,972 B2 | 11/2008 | Hellandbrand, Jr. et al. | |
| 7,561,654 B2 | 7/2009 | Makovicka et al. | |
| 7,668,280 B2 | 2/2010 | Hellandbrand, Jr. et al. | |
| 7,668,284 B2 | 2/2010 | Sparrow et al. | |
| 2008/0317193 A1 | 12/2008 | Sato | |
| 2010/0316181 A1 | 12/2010 | Thome et al. | |
| 2011/0158371 A1 * | 6/2011 | Sato ....................... | G21C 1/086 376/249 |

OTHER PUBLICATIONS

RCS. Reactor Cooling Systems. GlobalSecurity.org. 2 pages. available online Mar. 18, 2011. available: <https://web.archive.org/web/20110318103641/http://www.globalsecurity.org/wmd/intro/pu-cooling.htm>.*
United States Atomic Energy Commission. "Code of Federal Regulations, Title 10." pp. 252-253. (1972).*
International Search Report and Written Opinion for PCT/US2013/036877 dated Sep. 20, 2013.
Babcock & Wilcox Pressurized Water Reactors, Castleberry, G., Mar. 19, 2012.
"Small Modular Reactors—Key to Future Nuclear Power Generation in the U.S.", Technical Paper., Rosner, R. et al., Nov. 2011.
Extended European Search Report dated Nov. 11, 2015 for European Application No. 13777769.4.
Office Action dated Apr. 19, 2016 for Chinese Application No. 201380031835.7.
"The design and safety features of the IRIS reactor", Mario D. Carelli, et al., Nuclear Engineering and Design 230 (pp. 151-167), 2004.
Office Action dated Feb. 7, 2019 for Canadian Patent Application No. 2,870,859 (4 pages).

* cited by examiner

DEFENSE IN DEPTH SAFETY PARADIGM FOR NUCLEAR REACTOR

This application claims the benefit of U.S. Provisional Application No. 61/625,238 filed Apr. 17, 2012. This application claims the benefit of U.S. Provisional Application No. 61/625,244 filed Apr. 17, 2012.

U.S. Provisional Application No. 61/625,238 filed Apr. 17, 2012 is hereby incorporated by reference in its entirety. U.S. Provisional Application No. 61/625,244 filed Apr. 17, 2012 is hereby incorporated by reference in its entirety.

BACKGROUND

The following relates to the nuclear reactor arts, nuclear reactor operating arts, nuclear reactor safety arts, and related arts.

The nuclear island of a nuclear power plant includes a nuclear reactor and a steam generator housed inside a containment structure (sometimes simply called containment), along with various auxiliary systems. The containment is typically a steel or steel-reinforced concrete structure designed to contain any radioactive emissions.

The nuclear reactor is typically of the boiling water reactor (BWR) variety or the pressurized water reactor (PWR) variety. In BWR designs the steam generator is omitted as radioactive steam generated by water boiling inside the BWR directly drives the electrical power generating turbine. PWR designs generate subcooled water. The subcooled water heats feedwater in a steam generator to generate the non-radioactive working steam that drives the turbine. The steam generator is typically located outside the pressure vessel (but still inside containment) and is connected with the reactor by a primary coolant loop of large-diameter piping. However, in integral PWR designs the steam generator is a component housed inside the pressure vessel. In either PWR design, the steam generator serves as a heat sink for the nuclear reactor.

Auxiliary non-safety systems include the pressurizer and a reactor coolant inventory and purification system (RCI). In PWR designs, the pressurizer contains a steam bubble whose pressure can be increased by heating (e.g., with resistive heaters) or decreased by cooling (e.g. by sparging cool water or steam into the steam bubble). The pressurizer communicates with the pressure vessel through a baffle plate (in the case of an integral pressurizer) or via piping (in the case of an external pressurizer), and therefore provides buffered control of primary coolant pressure inside the pressure vessel. The RCI maintains the primary coolant water level in the pressure vessel during normal reactor operation by performing "let down" to remove coolant from the pressure vessel, or injecting make-up water into the pressure vessel. The RCI also maintains an inventory of purified water outside of the pressure vessel for use as make-up water. The nuclear reactor may also include reactor coolant pumps (RCPs) to assist or drive primary coolant circulation in the pressure vessel. Alternatively, natural circulation driven by the hot reactor core may suffice.

A control rods system includes control rods comprising neutron poison that are inserted into guide tubes passing through the reactor core. Controlled partial rod insertion (i.e. "gray rod" operation) enables precise control of the nuclear chain reaction. On the other hand, rapid full insertion of the rods (i.e., SCRAM) immediately shuts down the nuclear chain reaction. (However, unstable intermediate reaction products continue to generate decay heat long after the chain reaction is extinguished). Control rod drive mechanisms (CRDMs) including motors operate the control rods. A given control rod drive can have gray rod functionality, shutdown functionality, or both. The CRDMs are typically located outside of the pressure vessel, conventionally below the vessel in BWR designs and above the vessel in PWR designs. However, integral CRDM designs are known in which the CRDMs are located inside the pressure vessel.

Safety systems include an emergency core cooling system (ECC) that provides high pressure decay heat removal from the pressure vessel to an in-containment heat reservoir such as a refueling water storage tank (RWST) located inside containment, and also includes a high pressure water injection system for injecting water from the RWST (or another source located inside containment) into the pressure vessel. The ECC may include a borated water tank containing a solution of soluble boron dissolved in water for injection under high pressure into the pressure vessel. Boron is a neutron poison, such that injection of borated water helps terminate the nuclear chain reaction. The safety systems also typically include a mechanism for flooding containment with water, for example sourced from the RWST. The safety systems still further include an ultimate heat sink (UHS) located outside containment into which heat is expelled. The UHS may, for example, be a lake or other large body of water, a cooling tower, or so forth. The purpose of the safety systems is to contain and condense any steam generated by a LOCA or other safety event so as to depressurize the pressure vessel and containment. The condensing produces heat that is rejected to the UHS located outside of containment, for example via a heat exchanger. There is redundancy built-in for all safety systems. For example, the United States Nuclear Regulatory Commission (NRC) requires at least two independent systems for performing each safety operation.

During normal operation, the non-safety systems are operative to maintain the nuclear reactor within a normal operational envelope, e.g. within acceptable pressure and water level ranges. Temperature control is provided by controlling the nuclear chain reaction using the gray rods. Pressure control is provided by the pressurizer. Water level is controlled by the RCI. The temperature and pressure (and, to a lesser extent, the water level) are interrelated.

The non-safety systems are also operative during normal startup and shutdown of the nuclear reactor. Shutdown entails providing orderly termination of the nuclear chain reaction and dissipating residual decay heat until the reactor core cools sufficiently to open the reactor pressure vessel. In one approach, the control rods are inserted to terminate the chain reaction. A low level of residual decay heat continues to be emitted by the reactor core due to spontaneous decay of unstable intermediate reaction products having short half-lives of order minutes to weeks. Since this residual heat is much less than the thermal output of the core during normal operation, the vessel pressure can be lowered, and low pressure decay heat removal systems of the RCI, e.g. a low pressure condenser, can be brought online to dissipate the decay heat. Once at a safe residual thermal output level, the water level can be reduced, again using the RCI, and the pressure vessel safely opened.

In a safety event such as a loss of heat sink (e.g. loss of feedwater to the steam generator, or failure of the turbine), electrical blackout (which can lead to shutdown of the RCPs and other components), or a loss of coolant accident (LOCA), the safety systems are invoked to perform a rapid controlled depressurization and shutdown of the reactor. The safety systems deploy responsive to the reactor going outside of its safe operational envelope, or in response to a specific fault trigger signal (e.g., a turbine trip or RCP trip), and are designed to operate passively (for example, in a PWR the shutdown rods are actively held out of the reactor core and passively fall into the core in response to loss of power) or are powered by standalone batteries or diesel generators. The response typically includes dropping the shutdown control rods (SCRAM) and bringing the ECC online to depressurize the reactor and dissipate the residual decay heat. After reactor shutdown in response to a safety event, the process of bringing the nuclear reactor back online is lengthy. For example, the boron-containing solute injected into the pressure vessel by the ECC must be filtered out of the primary coolant. Water in the UHS must be replenished, and water in the RWST must be entirely replaced (as the ECC injects radioactive steam into the RWST). In addition to such recovery operations, government regulations typically dictate that an analysis of the safety event be completed before authorizing bringing the reactor back online.

SUMMARY

In one embodiment, a method comprises operating a nuclear reactor disposed in a containment structure and including a nuclear reactor core comprising fissile material disposed in a pressure vessel and immersed in primary coolant water at an operating pressure higher than atmospheric pressure. The operating includes maintaining primary coolant water level in the pressure vessel using a reactor coolant inventory and purification system (RCI) connected with the pressure vessel by make-up and letdown lines. The method further comprises responding to a safety event by response operations including shutting down the nuclear reactor core by scramming control rods and dissipating heat generated by the nuclear reactor core after shutting down using a high pressure decay heat removal component of the RCI that is connected to the pressure vessel by the make-up and letdown lines of the RCI.

In accordance with another aspect, a method comprises operating a nuclear reactor disposed in a containment structure and including a nuclear reactor core comprising fissile material disposed in a pressure vessel and immersed in primary coolant water at an operating pressure higher than atmospheric pressure. The operating includes maintaining primary coolant water level in the pressure vessel using a reactor coolant inventory and purification system (RCI) connected with the pressure vessel by make-up and letdown lines. The method further comprises responding to a loss of coolant accident (LOCA) by response operations including: shutting down the nuclear reactor core by scramming control rods; responsive to the primary coolant water level decreasing below a first water level threshold, operating the RCI to add primary coolant water to the pressure vessel via the make-up line; and operating an emergency core cooling system (ECC) to depressurize the nuclear reactor only if the primary coolant water level decreases below a second water level threshold lower than the first water level threshold.

In accordance with another aspect, an apparatus comprises: a nuclear reactor including a nuclear reactor core comprising fissile material disposed in a pressure vessel and immersed in primary coolant water at an operating pressure higher than atmospheric pressure; a containment structure containing the nuclear reactor; and a reactor coolant inventory and purification system (RCI) connected with the pressure vessel by make-up and letdown lines, the RCI rated to operate at the operating pressure and including a high pressure heat exchanger configured to operate responsive to a safety event at the operating pressure to remove heat from the primary coolant water in the pressure vessel.

In accordance with another aspect, an apparatus comprises: a nuclear reactor including a nuclear reactor core comprising fissile material disposed in a pressure vessel and immersed in primary coolant water at an operating pressure higher than atmospheric pressure; a containment structure containing the nuclear reactor; and a reactor coolant inventory and purification system (RCI) connected with the pressure vessel by make-up and letdown lines, the RCI rated to operate at the operating pressure and including a pump configured to inject make-up water into the pressure vessel via the make-up line against the operating pressure.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
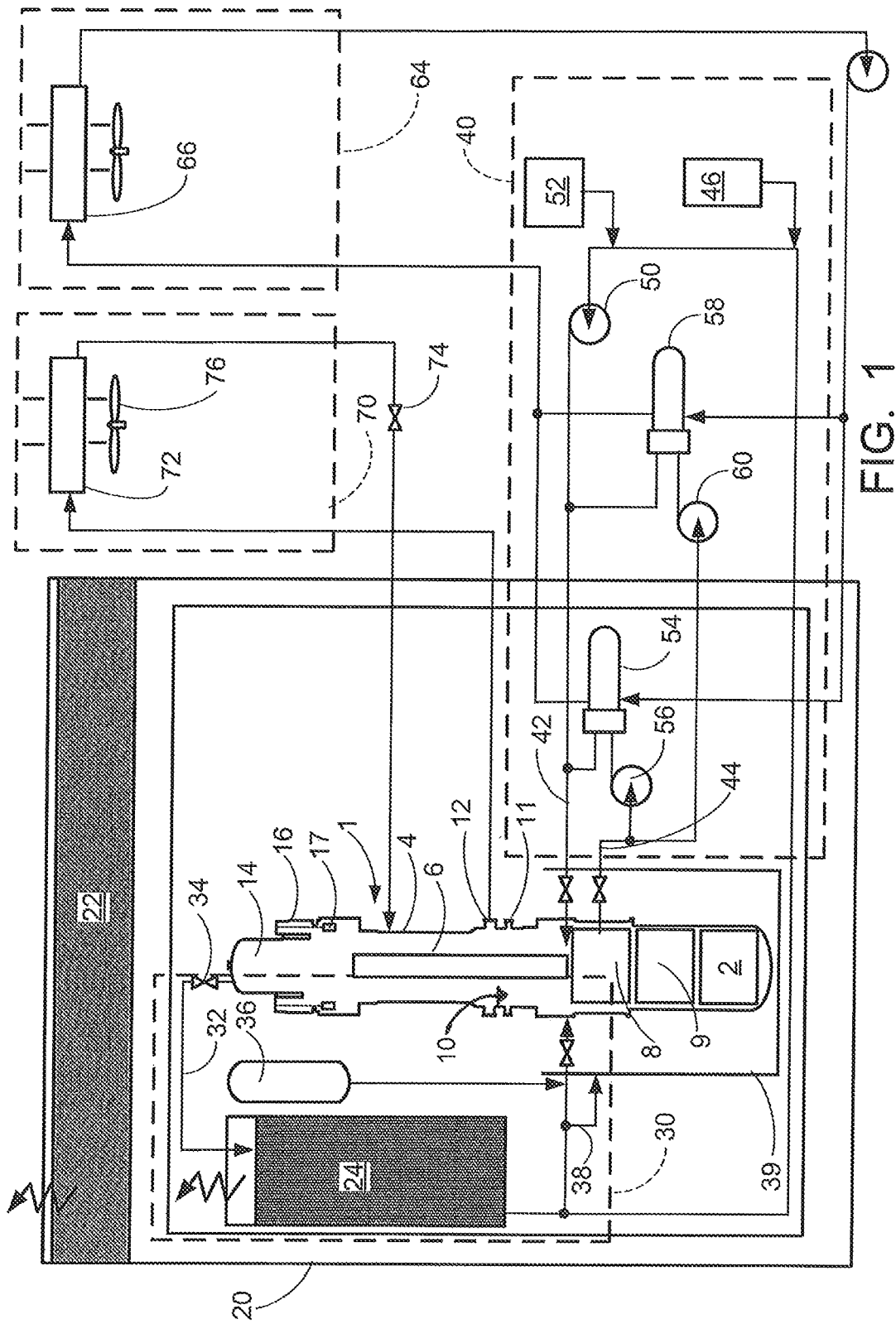
FIG. 1 diagrammatically shows a nuclear island including an integral pressurized water reactor (integral PWR) and systems for performing both normal operation and safety response.

Disclosed herein are safety response systems and methods which provide multiple layers of safety. The initial layer or layers leverage non-safety systems and high pressure safety systems to keep the reactor within its safe operating envelope without depressurizing the reactor. Reactor depressurization is not performed unless the first level(s) of response are unable to contain the safety event.

In addition to striving to avoid depressurizing the reactor, another aspect of the disclosed defense in depth strategy is to maximize heat transfer during a safety event to heat sinks other than the ultimate heat sink (UHS). This extends the useful time over which the UHS can be used before replenishment of water must be performed.

The disclosed approaches, referred to herein as "defense in depth", are a paradigm shift away from the conventional approach of automatically initiating reactor shutdown upon detection of a safety event (i.e. a safety trip and/or reactor state moving outside its usual operational envelope) and toward a remedial strategy that employs the non-safety systems to maintain the reactor in its safe operational envelope.

One aspect of the defense in depth strategy is to deploy non-safety systems rated to operate effectively at high reactor pressure, so that these non-safety systems can be used to respond to a safety event without depressurizing the reactor. Toward this end, the reactor coolant inventory and purification system (RCI) is pressure-hardened so that it can continue to function during a safety event. The pressure-hardened RCI is provided with a high pressure injection circulation pump to inject make-up water (optionally borated) into the reactor at high pressure without requiring depressurization of the reactor pressure vessel. The RCI is also modified to include a high pressure decay heat removal component so as to provide decay heat removal at (or even above) normal operating pressure of the reactor. The illustrative high pressure condenser of the RCI expels heat to a component cooling water system located outside containment.

Another aspect of the defense in depth strategy is to provide an additional safety component that enables residual heat removal at high pressure. Together with the high pressure condenser of the pressure-hardened RCI, this provides a redundant mechanism for decay heat removal at high reactor pressure. In the illustrative embodiments, this additional safety component is an air-cooled auxiliary condenser (CNX) located outside of containment and connected with the steam generator. Water in the steam generator lines is heated to form steam that is condensed by the CNX to expel decay heat outside of containment. The air-cooled CNX expels the heat into the ambient air, rather than into the UHS.

The combination of the pressure-hardened and modified RCI and the CNX enable many safety events to be controlled without depressurizing the reactor vessel, and without rejecting heat to the UHS. Only if these systems are unable to keep the reactor state within a safe operating envelope does the ECC operate. In one suitable control approach, the pressure-hardened RCI and CNX systems are invoked at a first high pressure threshold (and/or first low water level threshold) and ECC operation is triggered at a second, higher pressure threshold (and/or second, lower, water level threshold).

Another aspect of the defense in depth strategy is to provide isolation valves at vessel penetrations large enough to generate a LOCA that could trip the ECC. (The isolation valves may also be employed at vessel penetrations that are too small to trip the ECC). These isolation valves provide a first level of defense against a LOCA by preventing it from occurring at all.

Another aspect of the defense in depth strategy is providing direct coupling between the ultimate heat sink (UHS) and containment. In the illustrative embodiment this is achieved by making the containment partially or entirely subterranean and forming the UHS as a body of water above and in thermal contact with the containment. With this arrangement, even if the ECC fails and is unable to transfer heat to the UHS, the primary coolant converted to steam and escaping from the reactor pressure vessel into containment is cooled by passive thermal contact between the containment and the UHS.

Yet another aspect of the defense in depth strategy is that the foregoing systems can operate in parallel. For example, even if an isolation valve fails so as to generate a LOCA, the remaining isolation valves continue to operate. Similarly, if the ECC is triggered, the pressure-hardened RCI and CNX systems continue to operate to dissipate heat. This operation may be at a reduced capacity—for example, the high pressure heat exchanger of the RCI and/or the CNX condenser may operate inefficiently, or cease operation altogether, if the temperature increases to a point at which condensation is limited. However, to the extent that these systems continue to operate in parallel with the ECC, they reduce the load on the ECC and the UHS. The passive thermal communication between containment and the UHS is operative anytime primary coolant steam escapes from the reactor vessel into containment, and provides heat rejection from containment regardless of whether the ECC is in operation. In short, the defensive layers are not alternative but rather are additive, and operate in concert to maximize remediation of any safety event.

With reference to FIG. 1, an illustrative nuclear island is shown, including a small modular reactor (SMR) 1 of the pressurized water reactor (PWR) variety. The illustrative PWR 1 includes a nuclear reactor core 2 disposed in a pressure vessel 4. The reactor core 2 comprises a fissile material (e.g., $^{235}U$) immersed in primary coolant water. A cylindrical central riser 6 is disposed coaxially inside the cylindrical pressure vessel and a downcomer annulus is defined between the central riser 6 and the pressure vessel 4. The illustrative PWR 1 includes internal control rod drive mechanisms (internal CRDMs) 8 that control insertion of control rods to control reactivity; however, the reactor can alternatively employ external CRDMs. In either case, guide frame supports 9 guide the translating control rod assembly (not shown; typically each control rod assembly includes a set of control rods comprising neutron absorbing material yoked together by a spider and connected via a connecting rod with the CRDM). The illustrative PWR 1 is an integral PWR that includes an internal (or "integral") steam generator 10 located inside the pressure vessel. Embodiments in which the steam generator is located outside the pressure vessel (i.e., a PWR with external steam generators) are also contemplated. The steam generator 10 is fed by a feedwater inlet 11 and deliver steam to a steam outlet 12. (Note, the secondary coolant circuit is not shown in diagrammatic FIG. 1. The secondary coolant circuit feeds steam from the steam outlet 12 to a turbine to generate electricity and typically further includes a water supply delivering feedwater to the feedwater inlet 11. The secondary coolant circuit may also include optional condensers to regenerate feedwater from the steam after passing through the turbine, optional purification/filtering components, and so forth.) The illustrative PWR 1 includes an integral pressurizer 14 at the top of the pressure vessel 4 which defines an integral pressurizer volume; however an external pressurizer connected with the pressure vessel via suitable piping is also contemplated. Primary coolant water in the pressure vessel 4 is circulated by reactor coolant pumps (RCPs) comprising in the illustrative example external RCP motors 16 driving an impeller located in a RCP casing 17 disposed inside the pressure vessel 4. It is to be appreciated that the PWR 1 is merely an illustrative example—the disclosed operating procedures are suitably employed in substantially any type of PWR.

The nuclear island also includes a containment structure 20 (also called simply containment 20) that contains the PWR 1 to prevent any radioactive primary coolant steam from escaping into the outside environment. The containment 20 is suitably a concrete or steel-reinforced concrete structure, although other building materials are contemplated. An ultimate heat sink (UHS) 22 is disposed above containment 20 and is in thermal contact with the containment 20, for example via a floor of the UHS 22 that is also the roof or top of the containment 20. The this interface between containment 20 and the UHS 22 should be thermally conductive; optionally, the thermal conduction through this interface may be enhanced by adding steel rebars (or a higher density of such rebars, in the case of a containment made of steel-reinforced concrete), thermally conductive heat pipes, or other heat transfer-enhancing structures. Thermal conduction can also be increased by making the top or roof of the containment 20 of reduced thickness, although this is to be balanced against maintaining sufficient structural strength both to support the UHS 22 and to contain primary coolant flash into the containment 20 for any credible accident scenario. The illustrative containment 20 has a flat top corresponding to a flat bottom of the UHS 22; however, in other contemplated embodiments the top is dome-shaped, optionally with a topmost portion of the dome protruding above the surface of the UHS (and, optionally, containing an access hatch).

The nuclear island includes various safety and non-safety systems. A refueling water storage tank (RWST) 24 is located inside containment. The RWST 24 provides water for use during reactor refueling or maintenance operations (hence the name "refueling" water storage tank), but also serves as a water source for the emergency core cooling system (ECC) 30. In addition to the RWST 24, the ECC 30 includes a sparger system 32 for injecting primary coolant steam into the RWST 24. When the ECC 30 is tripped, a valve 34 opens to initiate operation of the sparger 32. The ECC 30 also includes one or (preferably, for redundancy) more high pressure coolant injection tanks 36 that enable injection of water (optionally borated) into the pressure vessel 4 in order to ensure that the reactor core 2 remains immersed during a safety event. The ECC 30 still further includes a flood line 38 that can be opened during a safety event to flood a flood well 39 with water from the RWST 24 to ensure the reactor core 2 (located inside the flood well 39) remains immersed in water even if a rupture in the pressure vessel 4 occurs at a point below the top of the reactor core 2. It should be noted that the illustrative RWST 24 is shown diagrammatically, and in general the RWST can have various geometries and should have sufficient water capacity to provide water for the various functions including flooding the flood well 39 while retaining a sufficient volume of water to heat sink primary coolant steam injected by the sparger system 32. As seen in FIG. 1, the piping that delivers water from the injection tank(s) 36 to the pressure vessel 4 at high pressure is also configured with suitable valving to enable delivering water at low pressure from the RWST 24 into the pressure vessel 4. The valving switches from the high pressure water injection tank(s) 36 to the RWST 24 when the pressure in the pressure vessel 4 becomes low enough to receive water from the RWST 24.

The nuclear island also includes a reactor coolant inventory and purification system (RCI) 40, which as disclosed herein is pressure-hardened and includes additional components as compared with a conventional RCI. The pressure-hardening entails using piping and valves in the RCI 40 that are designed (i.e. rated) to handle the operating pressure of the nuclear reactor 1. The RCI 40 is connected with the nuclear reactor 1 via a make-up line 42 via which primary coolant water can be added to the pressure vessel 4 and via a let-down line 44 via which primary coolant can be removed from the pressure vessel 4. Valving on the make-up and letdown lines 42, 44 optionally includes suitable check valves. The RCI 40 includes a conventional make-up water tank 46 and suitable filtering or other purification apparatus (not shown) to maintain a supply of purified primary coolant water in the make-up water tank 46. The make-up water tank 46 provides make-up water for maintaining the primary coolant water level in the pressure vessel 4 during normal operations.

Additionally, a high pressure pump 50 is provided to inject primary coolant water from the make-up tank 46 and/or from an optional dedicated safety tank 52 into the pressure vessel via the make-up line against the operating pressure for the purpose of remediating a safety event such as a LOCA. In some embodiments the make-up tank 46 is used only during normal operations—this has the advantage of allowing the make-up tank 46. The optional dedicated safety tank 52 may be the sole source of make-up water for remediating a safety event such as a LOCA, or alternatively water may be drawn only from the usual make-up tank 46 (in which case safety tank 52 is omitted). As yet another option, make-up water for remediating the safety event (e.g. LOCA) may be drawn from both tanks 46, 52—in this case the safety tank 52 optionally contains borated water so as to serve as a soluble neutron poison.

The illustrative RCI 40 further includes a high pressure decay heat removal component, such as an illustrative high pressure heat exchanger 54, that is connected with the pressure vessel 4 via the make-up and letdown lines 42, 44. Since the RCI 40 is pressure-hardened, the high pressure heat exchanger 54 can operate during a safety event to remove decay heat without depressurizing the nuclear reactor 1. A high pressure circulating pump 56 is provided to flow primary coolant water through the high pressure heat exchanger 54. Optionally, the RCI 40 also includes a low pressure heat exchanger 58 located outside containment 20 for use in removing residual heat when the reactor is depressurized. Primary coolant flow through the low pressure heat exchanger 58 is driven by a low pressure circulating pump 60. The residual heat removal system 58, 60 is used, for example, during normal reactor shutdown to dissipate residual heat. Optionally, the low pressure heat removal system 58, 60 is omitted and the high pressure heat removal system 54, 56 is used both to respond to safety events and for residual heat removal during normal operations.

The heat removal components 54, 58 of the illustrative RCI 40 expel the removed heat to a component cooling water system 64 that provides cooling water to the RCP motors 16 and other water-cooled components of the nuclear island. The component cooling water system 64 is suitably located outside containment 20. A condenser, radiator, or other heat dissipation element or elements 66 is suitably incorporated into the component cooling water system 64 to efficiently transfer the heat removed by the components 54, 58 to the component cooling water supply. The illustrative heat dissipation element 66 is an air-cooled radiator or condenser, but other heat dissipation elements are also contemplated.

The nuclear island diagrammatically shown in FIG. 1 further includes an auxiliary condenser system 70 comprising an auxiliary condenser 72 that is located outside containment 20 and is connected via suitable valved piping with the integral steam generator 10 (or with an external steam generator connected with the nuclear reactor, in the case of a PWR with an external steam generator). The auxiliary condenser 72 uses secondary coolant water in the steam generator 10 as working fluid for the auxiliary condenser 72. In normal operation, the steam generator 10 transfers heat from primary coolant water in the pressure vessel 4 to secondary coolant water flowing into the inlet 11 to generate steam that exits the steam outlet 12. (Alternatively, if an external steam generator is employed, the steam generator transfers heat from primary coolant water supplied to the steam generator from the nuclear reactor via suitable large-diameter piping to convert secondary coolant water to steam.) In response to a safety event, such as the operating pressure of the nuclear reactor 1 rising above a pressure threshold, valving isolates the steam generator from the secondary coolant circuit (for example, by closing off main steam line and feedwater line valves) and a valve 74 on the condensate line of the auxiliary condenser 72 opens. This allows secondary coolant water from the steam generator 10 to flow through the auxiliary condenser 72 so as to expel heat from the primary coolant water inside the pressure vessel 4 outside containment. (Note that although the secondary coolant circuit is valved off, substantial secondary coolant water remains inside the steam generator, and it is this remaining secondary coolant water that serves as the working fluid for the auxiliary condenser 72.) In the illustrative embodiment, the high pressure line from the steam generator 10 to the auxiliary condenser 72 is normally open, even during normal operation, and a bleed valve (not shown) on the condensate line allows a small volumetric (i.e. bleed) flow of secondary coolant to flow through the auxiliary condenser 72 during normal operation. This bleed flow keeps the auxiliary condenser 72 hot and primed to operate immediately upon opening of the condensate line valve 74 to perform decay heat removal.

The auxiliary condenser 72 is located outside of the containment structure 20. The illustrative auxiliary condenser 72 is an air-cooled condenser that is cooled by one or (preferably, for redundancy) more fans 76, which are preferably battery-operated fans although diesel-operated fans or otherwise-powered fans are also contemplated. Moreover, a cooling method other than air cooling is also contemplated, such as water cooling, draft cooling (e.g., using a chimney), or so forth.

While diagrammatic FIG. 1 shows one auxiliary condenser 72 and one high pressure heat removal component 54 on the RCI 40, it is contemplated to include two or more auxiliary condensers 72 and/or two or more high pressure heat removal component 54 on the RCI 40 for redundancy. The powered components pertaining to safety, e.g. the high pressure pumps 50, 56, are preferably battery-driven or operated off a diesel generator, or have battery and/or diesel generator backup power, to ensure continued operation in the event of a station blackout.

In the illustrative nuclear island of FIG. 1, neither the high pressure heat removal component 54 on the RCI 40 nor the auxiliary condenser 72 expel heat into the ultimate heat sink (UHS) 22. This ensures that the water supply in the UHS 22 is not depleted by boiling or evaporation due to operation of the heat removal components 54, 72. This ensures that heat removal performed by the RCI 40 and the auxiliary condenser system 70 are wholly independent of, and can operate in parallel with, heat removal via the ECC 30 and/or by direct thermal conduction between containment 20 and the UHS 22.

Figure 2:
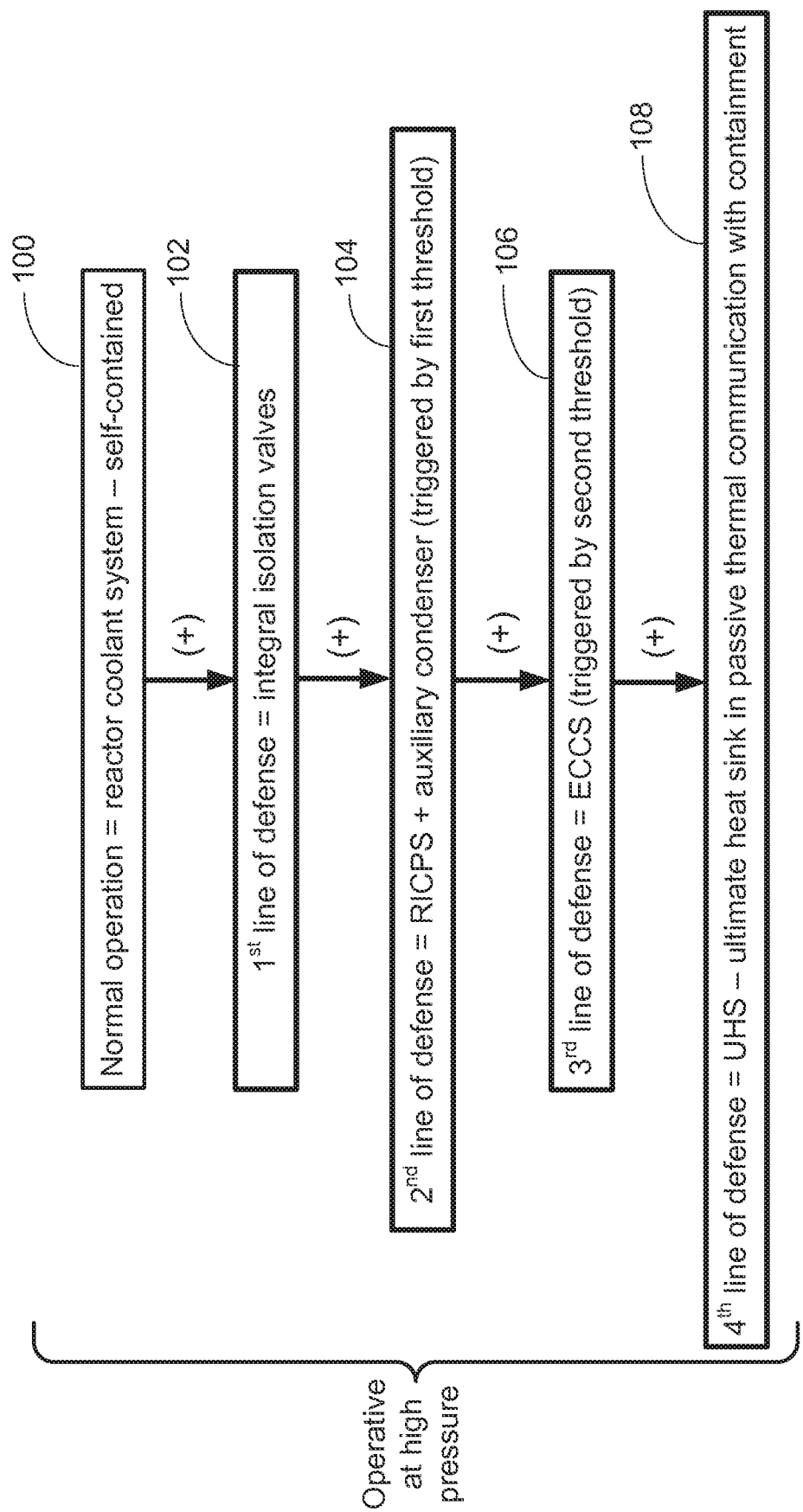
FIG. 2 diagrammatically shows a safety response workflow suitably performed in the context of the illustrative nuclear island of FIG. 1.

With reference to FIG. 2, the defense-in-depth provided by the systems of the illustrative nuclear island of FIG. 1 are described. During normal operation 100, the reactor coolant system comprising the primary coolant water heat sinked by the steam generator 10 and pressure and water level control provided by the pressurizer 14 and RCI 40, respectively, operate to keep the nuclear reactor 1 in its safe operating envelope. A first line of defense 102 is provided by integral isolation valves that are preferably installed at all vessel penetrations, or at least at all vessel penetrations large enough for rupture to constitute a safety event that must be remediated. For example, under U.S. nuclear regulations, a leak via a pipe of diameter less than three-eighths inch is not considered a LOCA event.

A second line of defense 104 is brought online when a first threshold is exceeded (e.g., a first high pressure threshold, or a first low primary coolant water level threshold). The second line of defense 104 is performed in conjunction with reactor shutdown performed by releasing the shutdown control rods (i.e. scramming the control rods system 8, 9). The second line of defense 104 employs the combination of the RCI 40 and the auxiliary condenser system 70 in the case of a safety event triggered by a first high pressure threshold. Redundancy is advantageously provided by employing both systems 40, 70 concurrently to dissipate heat. Alternatively, the second line of defense 104 employs the high pressure (and optionally borated) make-up water injection performed by the RCI 40 in the case of a safety event triggered by a first low primary coolant water level threshold. In some embodiments the second line of defense 104 may also be triggered manually and/or by detection of specific safety events such as detection of a leak in a pipe of diameter greater than ⅜ths inch (constituting a LOCA according to U.S. nuclear regulations).

A third line of defense 106 is brought online when a second threshold is exceeded (e.g., a second high pressure threshold greater than the first high pressure threshold, or a second low primary coolant water level threshold greater than the first primary coolant water level threshold). The third line of defense 106 is the ECC 30, which depressurizes the nuclear reactor 1 by sparging steam into the RWST 24 (which also serves to remove decay heat) and floods (at least the lower portion of) the pressure vessel 4 and the flood well 39 to ensure that the reactor core 2 remains immersed.

A fourth line of defense 108 is the ultimate heat sink 22 in thermal contact with the containment 20. This purely passive cooling mechanism is operative whenever the ambient temperature inside the containment 20 rises above the temperature of the heat sink 22, and becomes more efficient as the temperature difference between containment 20 and the UHS 22 increases.

Although FIG. 2 lists layered lines of defense 102, 104, 106, 108 as a progression, their operation is actually principally additive, as indicated by the combinational notation "(+)" marked along the progression shown in FIG. 2. Thus, for example, while a LOCA may be caused by failure of an integral isolation valve at one vessel penetration (that is, a partial failure of the first line of defense 102), the integral isolation valves at the remaining vessel penetrations remain operative as additional lines of defense 104, 106, 108 are brought online. Similarly, the RCI 40 and auxiliary condenser system 70 (second line of defence 104) may remain operative even after the ECC 30 (third line of defense 106) is brought online. The fourth line of defense 108, namely the passive thermal transfer of heat from containment 20 to the UHS 22, is actually operative some extent anytime the temperature in containment 20 rises above the temperature of the UHS 22. So, this passive fourth line of defense 108 may begin operation earlier than indicated in the diagrammatic progression of FIG. 2.

Figure 3:
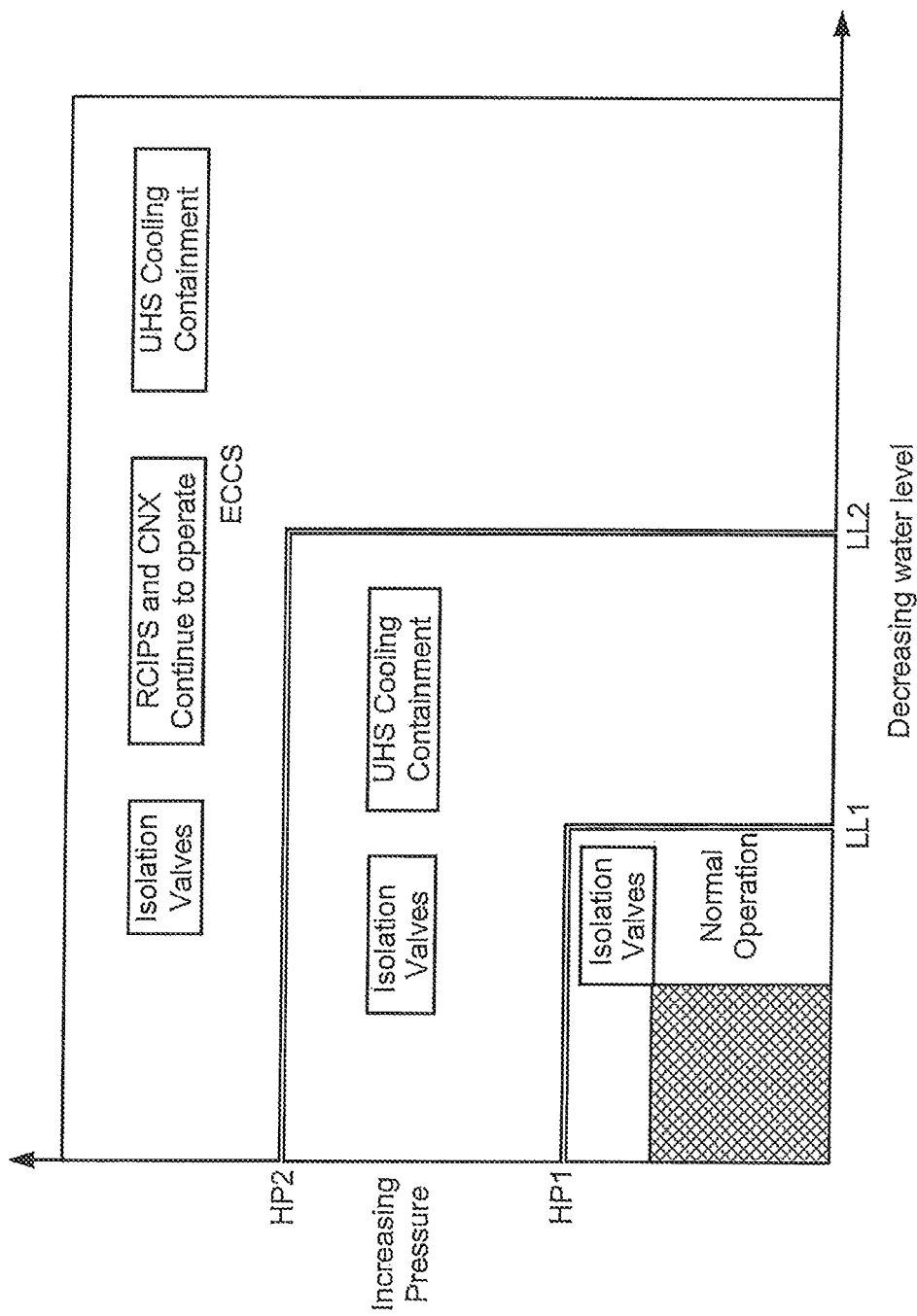
FIG. 3 diagrammatically shows a reactor operational space including various reactor state regions and the response mechanisms operative in those regions.

With reference to FIG. 3, operation of the defense in depth is shown in the alternative form of a diagrammatic nuclear reactor operational state diagram including axes for operational pressure (ordinate) and primary coolant water level (abscissa). The first (high) pressure threshold at which the second line of defense 104 is brought online is indicated as "HP1" and the second (high) pressure threshold at which the third line of defense 106 is brought online is indicated as "HP2". Similarly, the first (low) primary coolant water level threshold at which the second line of defense 104 is brought online is indicated as "LL1" and the second (low) primary coolant water level threshold at which the third line of defense 106 is brought online is indicated as "LL2". The normal operational state 100 of FIG. 2 corresponds to the lower left region of the state diagram of FIG. 3. (A portion of this region is shaded in FIG. 3 to indicate non-operational states in which the reactor is depressurized and/or at low water level. These shaded states are either unattainable or correspond to shutdown conditions, e.g. during refueling.)

The outer regions correspond to safety events. The first-outer region immediately surrounding the operational region corresponds to the region in which the second line of defense 104 is operating but the third line of defense 106 remains offline. In other words, in this region the RCI 40 and auxiliary condenser system 70 (indicated as "CNX" in FIG. 3) are operating to remove decay heat, and/or the RCI 40 is operating to inject make-up water against the operational pressure. The next-outer region corresponds to operation of the ECC 30 (fourth line of defense 108). In this outer region portions or all of the second line of defense 104 also remain operational.

In all regions, the isolation valves remain operative (except for any isolation valve that may have failed to create a LOCA). In the outer regions corresponding to a safety event, the UHS cooling of containment (that is, the fourth line of defense 108 of FIG. 2) is also operational—however, it is only actively removing heat if the containment temperature is elevated respective to the UHS 22.

Illustrative examples of the disclosed defense in depth strategy have been described in general terms with reference to FIGS. 1-3. The response to any specific safety event may depend upon the particulars of the safety event as well as the requirement to comply with any governing nuclear regulatory rules or laws. For example, in some regulatory jurisdictions certain safety events may be required to be remediated by invoking the ECC, and so it may not be permissible to remediate such safety events using the RCI 40 and/or auxiliary condenser system 70 alone. Other variations can similarly arise.

To provide further illustration of the disclosed defense in depth strategy, some specific examples are next set forth in the context of a small modular reactor (SMR) of the integral PWR variety in which all major reactor cooling system (RCS) components are located inside a single vessel assembly so as to eliminate large connecting piping and the potential for a large-diameter pipe break. The contemplated pressure vessel is similar to that shown in FIG. 1, and is constructed of lower and upper vessel sections with the reactor core and upper internals including the control rod system with integral CRDMs disposed in the lower vessel and the integral steam generator in the upper vessel. Small connecting piping providing coolant makeup and letdown are located at the top of the lower vessel. These are the make-up and letdown lines 42, 44 of FIG. 1. Additional connecting piping, located near the top of the upper vessel, provide pressurizer spray, and connect the top of the pressurizer to code safety valves and automatic depressurization valves. This configuration promotes natural circulation and minimizes the potential leak size. Integral isolation valves provide LOCA isolation comporting with applicable governing regulations (e.g., single failure criteria promulgated by the United States Nuclear Regulatory Commission, NRC).

The RCS is supported by the passive ECC 30 and the integral UHS 22 located on the containment 20, which in this embodiment has an upper dome whose center protrudes above the surface of the UHS pool, so that the UHS 22 in this embodiment is an annular body of water. When the RCS coolant conditions leave their normal operating envelope, the ECC 30 initiates a controlled depressurization of the RCS. As the RCS depressurizes, coolant is added from redundant intermediate pressure injection tanks (IPITs) 36 and after the depressurization is completed, from RWST 24 with redundant water compartments. The RWST 24 is sized to have sufficient water to provide long term cooling (e.g., for at least seven days), without makeup from outside sources. The water from long term cooling comes directly from the RWST 24, so LOCA debris are not an issue. Heat added to containment 20 in an accident is transferred passively to the UHS 22 via the fourth line of defense (see FIG. 2). If normal heating, ventilation, and air conditioning (HVAC) systems are not available, the water in the UHS 22 will boil away removing energy from the containment. In this illustrative example, sufficient water is provided in the UHS 22 to provide heat removal and pressure control for up to 14 days.

Further, in this illustrative example non-safety systems are used to maintain the RCS within its safe operating envelope during anticipated operating transients. Two systems that provide this protection are the auxiliary condenser system 70 (also denoted by the acronym "CNX") and the reactor coolant inventory and purification system (RCI) 40. In the event of loss of feedwater flow to the steam generator 10 during normal operation, the CNX 70 automatically actuates to provide long term heat removal. Steam from the steam generator 10 flows to the high pressure condenser 72 located on a reactor service building (RSB) roof (or elsewhere outside containment 20) where heat is transferred to the atmosphere, condensing the steam, which drains back passively to the steam generator 10. Condenser heat removal is controlled by battery powered fans 76. In this illustrative example, the batteries have capacity to maintain operation of the CNX system 70 for a minimum of eight hours, even in station blackout conditions.

The CNX 70 is backed up by (or operates concurrently with) the RCI 40. The RCI 40 is designed to also provide decay heat removal from the RCS. At high pressures and temperatures, the letdown heat exchangers 54 and circulation pumps 56 cool the RCS until coolant pressures and temperatures allow the RCI 40 to transition to low pressure decay heat removal using the redundant, dedicated pumps 60 and heat exchangers 58 located in the reactor service building (RSB) or elsewhere. The RCI 40 also provides high pressure make-up capability and, optionally, can pump soluble boron into the RCS from the dedicated tank 52 to assure a desired shutdown margin (e.g., a 3% shutdown margin in this illustrative example) can be achieved at cold conditions, if the control rods fail to insert into the core 2.

In this design, the non-safety systems protect the nuclear island and minimize the likelihood of the RCS exceeding its safe operating envelope. If this envelope is approached however, the ECC takes the RCS back to a safe condition.

In the following, the response of the disclosed defense in depth to some specific safety event scenarios is described. Any specific quantities or values specified in these illustrative safety event scenarios are merely illustrative, and different or other quantities or values are contemplated depending upon the detailed nuclear island design, applicable nuclear regulations, and other design factors.

One specific safety event scenario disclosed as an illustrative example is a turbine trip with a normal plant response. A turbine trip will result in closure of the turbine throttle valve raising the steam pressure in the inlet line to the turbine. This will automatically cause the turbine bypass valves to open and initiate a gradual decrease in feedwater flow until a target reduced flow is reached. Reactor power will follow feedwater flow with core outlet temperature being held constant and primary coolant water level rising to a designed target level. The plant will remain in this condition until the turbine is brought on line, or the plant operators begin an orderly shutdown.

Another specific safety event scenario disclosed as an illustrative example is a turbine trip with a faulted plant response. A turbine trip with faults that prevent adequate turbine bypass will result in a reactor trip. This will automatically result in closure of the main steam and feedwater isolation valves and initiation of plant cooling using the auxiliary condenser system 70. If the auxiliary condenser system 70 is ineffective or unavailable, the high pressure decay heat removal component 54 of the RCI 40 will be initiated automatically. In an alternative embodiment, both the auxiliary condenser system 70 and the high pressure decay heat removal component 54 of the RCI 40 operate concurrently.

Another specific safety event scenario disclosed as an illustrative example is a loss of normal feedwater with a normal plant response. Loss of feedwater flow will initiate a reactor trip, closure of the main steam and feedwater isolation valves, and initiation operation of the auxiliary condenser system 70. The plant control system will control speed of the fans 76 of the auxiliary condenser 72 to maintain the RCS in hot standby conditions until the operator restores feedwater flow or begins orderly plant shutdown.

Another specific safety event scenario disclosed as an illustrative example is a loss of normal feedwater with a faulted plant response. If the auxiliary condenser system 70 does not provide adequate heat removal, then the high pressure decay heat removal component 54 of the RCI 40 will be automatically initiated, and will continue to cool the RCS and transition to low pressure residual heat removal. (Again, alternatively, both the auxiliary condenser system 70 and the high pressure decay heat removal component 54 of the RCI 40 operate concurrently). If the high pressure decay heat removal component 54 of the RCI 40 is not available, the ECC 30 will be initiated to depressurize the RCS and begin long-term decay heat removal.

Another specific safety event scenario disclosed as an illustrative example is loss of off-site power with a normal plant response. Loss of the electrical grid will result in closure of the turbine throttle valve to prevent overspeed, leading to a rise in steam pressure and the opening of the turbine bypass valves. Reactor power will then be reduced gradually until a low target power level is reached. The plant bus will simultaneously isolate from the grid to maintain voltage in the plant. Turbine load will drop to match station power requirements with excess steam being sent directly to the condenser of the secondary coolant loop.

Another specific safety event scenario disclosed as an illustrative example is loss of off-site power with a faulted plant response. Loss of feedwater flow will initiate a reactor trip, closure of the main steam and feedwater isolation valves, and initiation of operation of the auxiliary condenser system 70. The plant control system will control speed of the fans 76 of the auxiliary condenser 72 to maintain the RCS in hot standby conditions until the operator restores feedwater flow or begins orderly plant shutdown. The fans 76 are suitably powered by DC-powered motors connected to redundant batteries, each with an eight hour operating capacity. When the standby diesel generators are started, the auxiliary power system will recharge the batteries to ensure continuous operation.

Another specific safety event scenario disclosed as an illustrative example is a station blackout, that is, a loss of offsite power with failure to transition the plant to island mode and a failure of both (or all) standby diesel generators to start. If the auxiliary condenser system 70 is unable to adequately remove heat and auxiliary power cannot be recovered, the ECC 30 will be initiated on high RCS pressure (e.g., above the second high pressure threshold HP2 of FIG. 3). This will result in RCS depressurization and long-term decay heat removal using water in compartments of the RWST 24.

Another specific safety event scenario disclosed as an illustrative example is a loss of coolant accident (LOCA). The illustrative integral PWR example is limited to small breaks (four inches and smaller) because there are no vessel penetrations of diameter larger than four inches. There are various possible responses to a LOCA in one of these smaller (e.g., four inch diameter or smaller) vessel penetrations depending on the break location. The high pressure make-up components 50, 52 of the RCI 40 will be initiated on low water level, and the make-up water flow rate is progressively increased as the error signal between desired and actual water level increases. If the primary coolant water level in the pressurizer continues to fall, then a reactor trip signal will be generated and if the level continues to fall, letdown lines will be isolated at the integral isolation valves. A significant leak on a makeup line will be isolated by redundant check valves (which serve as the makeup line integral isolation valves).

On the other hand, breaks in piping leading to the automatic depressurization valves (ADVs) and code safety valves do not have integral isolation valves, so a break in these lines will result in continued primary coolant water inventory loss. When the primary coolant water level drops below the pressurizer heaters, high pressure ADVs will be opened to ensure RCS depressurization. This is followed by automatic injection from the intermediate pressure injection tanks (IPITs) 36 and opening of the low pressure ADVs. When the RCS pressure drops below the static head of the RWST 24, water will begin to drain into the reactor vessel. Steam, with some water, is vented back to the RWST 24 where the steam is released to containment. Water in the RWST 24 will slowly drop as decay heat boils it off. In this illustrative example, operation of the ECC 30 depends on DC electrical power to power the plant protection system and to open the high pressure ADVs; however, the ECC 30 does not depend on other systems.

Another specific safety event scenario disclosed as an illustrative example is an anticipated transient without scram (ATWS). Any operating transient that generates RCS parameters outside of the safe operating envelope will result in the initiation of a scram signal which is intended to cause the control rods to scram (i.e., fall into the reactor core 2 to shut down the nuclear chain reaction). To protect against a scram failure (that is, any occurrence in which the scram signal fails to cause the shutdown control rods to fall into the reactor core 2), the scram signal also triggers secondary protective mechanisms. In the case of a hydraulically actuated scram mechanism, the scram signal also causes closure of isolation valves upstream of the scram valves. This will isolate the CRDM latching cylinders from the pressure source and allow the natural leakage within the cylinders to depressurize and release the control rods. In addition to the redundant methods of dropping the shutdown control rods into the reactor core 2, there are two additional (albeit slower) methods of taking the reactor core subcritical. The first approach is to use the CRDM motors of control rods with gray rod functionality to insert the control rods. The second method, available in embodiments in which the high pressure make-up water tank 52 contains borated water, e.g. water with dissolved sodium pentaborate, is to use the high pressure make-up water injection components 50, 52 of the RCI 40 to inject borated water from the tank 52 in the reactor pressure vessel 4.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An apparatus comprising:
a nuclear reactor including a nuclear reactor core comprising fissile material disposed in a pressure vessel and immersed in primary coolant water at an operating pressure higher than atmospheric pressure;
at least one reactor coolant pump including a motor and an impeller, the impeller being disposed within the pressure vessel;
a containment structure containing the nuclear reactor;
a reactor coolant inventory and purification system connected with the pressure vessel by make-up and letdown lines, the reactor coolant inventory and purification system rated to operate at the operating pressure and including a high pressure heat exchanger disposed inside the containment structure and connected to the pressure vessel by the make-up and letdown lines and configured to operate responsive to a safety event at the operating pressure to remove heat from the primary coolant water in the pressure vessel;
a make-up water tank containing a supply of purified water as make-up primary coolant;
a first pump disposed inside the containment structure, the first pump having an inlet connected to the letdown line, and an outlet connected to the high pressure heat exchanger and being configured to flow primary coolant water through the high pressure heat exchanger; and
a second pump disposed outside the containment structure, the second pump having an inlet connected to the make-up water tank, an outlet connected to the make-up line and being configured to inject purified make-up water into the pressure vessel via the make-up line at the operating pressure during normal power operations.

2. The apparatus of claim 1, wherein the high pressure heat exchanger of the reactor coolant inventory and purification system is configured to expel the removed heat to a component cooling water system supporting the nuclear reactor.

3. The apparatus of claim 1, wherein the high pressure heat exchanger of the reactor coolant inventory and purification system is configured to operate responsive to the operating pressure exceeding a first pressure threshold.

4. The apparatus of claim 3, further comprising:
an emergency core cooling system configured to operate to depressurize the nuclear reactor responsive to the operating pressure exceeding a second pressure threshold higher than the first pressure threshold.

5. The apparatus of claim 1, further comprising:
a steam generator disposed inside the containment structure and integral with or connected with the nuclear reactor, the steam generator heating secondary coolant water using primary coolant water disposed in or supplied by the nuclear reactor;
an auxiliary condenser disposed outside the containment structure, the auxiliary condenser being connected to the steam generator by piping; and
a valve disposed on the piping connecting the auxiliary condenser to the steam generator, the valve being configured to open independently of the isolation valve of the main steam line to allow secondary coolant water from the steam generator to flow through the auxiliary condenser so as to expel heat from the primary coolant water outside containment.

6. The apparatus of claim 5, wherein the auxiliary condenser is an air cooled condenser.

7. The apparatus of claim 6, wherein the auxiliary condenser includes battery driven fans providing air cooling.

8. The apparatus of claim 5, further comprising:
an ultimate heat sink (UHS), the auxiliary condenser not expelling heat from the primary coolant water into the UHS.

9. The apparatus of claim 5, further comprising:
an ultimate heat sink comprising a pool of water disposed on top of and in thermal contact with the containment structure.

10. An apparatus comprising:
a nuclear reactor including a nuclear reactor core comprising fissile material disposed in a pressure vessel and immersed in primary coolant water at an operating pressure higher than atmospheric pressure;
at least one reactor coolant pump including a motor and an impeller, the impeller being disposed within the pressure vessel;
a containment structure containing the nuclear reactor; and
a reactor coolant inventory and purification system connected with the pressure vessel by make-up and letdown lines, the reactor coolant inventory and purification system rated to operate at the operating pressure and including a high pressure heat exchanger disposed inside the containment structure and connected to the pressure vessel by the make-up and letdown lines and configured to remove heat from the primary coolant water, a make-up water tank containing a supply of purified water as make-up primary coolant, a first pump disposed inside the containment structure, the first pump having an inlet connected to the letdown line, and outlet connected to the high pressure heat exchanger and being configured to flow primary coolant water through the high pressure heat exchanger, and a second pump disposed outside the containment structure, the second pump having an inlet connected to the make-up water tank, an outlet connected to the make-line and being configured to inject purified make-up water into the pressure vessel via the make-up line at the operating pressure during normal power operations.

11. The apparatus of claim 10, wherein the reactor coolant inventory and purification system is configured to operate the second pump responsive to the primary coolant water level in the pressure vessel decreasing below a first water level threshold.

12. The apparatus of claim 11, further comprising:
an emergency core cooling system configured to operate to depressurize the nuclear reactor responsive to the primary coolant water level in the pressure vessel decreasing below a second water level threshold lower than the first water level threshold.

13. The apparatus of claim 10 wherein the reactor coolant inventory and purification system further includes:
a tank containing borated water, the second pump of the reactor coolant inventory and purification system configured to inject borated make-up water from the tank into the pressure vessel via the make-up line at the operating pressure.

* * * * *